(12) United States Patent
Broersma (10) Patent No.: US 6,590,649 B1
(45) Date of Patent: Jul. 8, 2003

(54) SPECTROPHOTOMETER (75) Inventor: Harmen Broersma, Amsterdam (NL)

(73) Assignee: Spectrostar B.V., Amsterdam (NL)

( * ) Notice: Subject to any disclaimer, the term of this patent is extended or adjusted under 35 U.S.C. 154(b) by 0 days.

(21) Appl. No.: 09/890,343

(22) PCT Filed: Dec. 16, 1999

(86) PCT No.: PCT/NL99/00778

§ 371 (c)(1),
(2), (4) Date: Jan. 2, 2002

(87) PCT Pub. No.: WO00/45140

PCT Pub. Date: Aug. 3, 2000

(30) Foreign Application Priority Data

Jan. 27, 1999 (NL) .............................. 1011146

(51) Int. Cl.[7] ............... G01J 3/18; G01J 3/02
(52) U.S. Cl. .................. 356/328; 356/334
(58) Field of Search ................ 356/319, 326, 356/328, 334

(56) References Cited

U.S. PATENT DOCUMENTS 4,838,645 A    6/1989    Machler et al.
5,371,586 A    12/1994    Chau

FOREIGN PATENT DOCUMENTS

JP    WO 82/01631    5/1982

*Primary Examiner*—F. L. Evans
(74) *Attorney, Agent, or Firm*—Swanson & Bratschun, L.L.C.

(57) ABSTRACT

A spectrophotometer, comprising a housing in which a measuring system is arranged, which housing has a measuring opening, via which light is passed to the measuring system. The measuring system comprises a grating monochromator, an autocollimator cooperating therewith, and detection means for the light originating from the grating monochromator. The grating monochromator and the autocollimator thereby form one whole.

20 Claims, 10 Drawing Sheets

SPECTROPHOTOMETER

RELATED APPLICATIONS

This application is a 35 U.S.C. §371 national phase application of PCT/NL99/00778 (WO 00/45140), filed on Dec. 16, 1999, entitled "Spectrophotometer," which claims priority to the Netherlands Application Number 1011146, filed Jan. 27, 1999.

The present invention relates to a spectrophotometer, comprising a housing in which a measuring system is arranged, which housing has a measuring opening, via which light is passed to the measuring system, and whereby the measuring system comprises a grating monochromator, an autocollimator cooperating therewith, and detection means for the light originating from the grating monochromator. More in particular, the invention relates to such a spectrophotometer, which also comprises an illuminator in a 45°/0° configuration with a light source formed by a lamp and an illuminator optic, whereby after reflection light emitted by the lamp is passed via a measuring opening into a housing.

A spectrophotometer as defined in the opening paragraph is known from the international patent application WO82/0163. For such a measuring system a spectrophotometer ISO standards have been fixed; in the most recent ISO standards for color measurement an optical band width of 10 nm is recommended and a maximum value of 20 nm is prescribed. Moreover, the measuring system must be sensitive to collimated light to comply with these standards, whereby the rays entering the housing are allowed to deviate from the optical axis by up to 5°. The sensitivity to light from other directions must be minimal.

As indicated, light refraction takes place by means of an optical reflection grating. The detection often takes place by means of an array of photosensitive cells, in particular an integrated circuit with an array of photodiodes. In addition, other methods of light refraction and detection are used in practice. Known is, or instance, light refraction by means of a prism or a number of constant color filters or a linearly variable color filter. The detection may also occur with one single measuring cell, whereby for measuring different wavelengths the optical grating or the color filter device is rotated, for instance with a stepping motor with which the whole measuring range can be scanned within a few seconds.

Measuring techniques by means of grating monochromators are extensively described in E. G. Loewen, E. Popov; *Diffraction gratings and applications* (Marcel Dekker, Inc., New York, 1997), in particular in Chapter 12 thereof. Such techniques can be divided into two main categories: constructions with plane reflection gratings and constructions with concave reflection gratings. Nearly all the constructions with plane reflection gratings make use of one or more concave mirrors for collimating the light. A known exception is the so-called Littrow arrangement, which, however, is designated in the above literature as out-of-date (page 444). The concave reflection gratings are relatively expensive, but offer various advantages, in particular because of their applicability in the UV range and because of their simple construction. As a special advantage it holds that the functions of dispersion and autocollimation are combined therein; other optical components are not required therefor, which also prevents lining-up and stability problems.

For plane reflection gratings the Monk-Gillison arrangement is designated as the simplest and cheapest system (see the above literature, paragraph 12.5). In this system only two components are used for dispersion and collimation, namely a concave mirror and a reflection grating.

The object of the invention is to provide the spectrophotometer with a measuring system which means a further simplification with respect to the Monk-Gillison arrangement, which is additionally inexpensive and also complies with the above ISO standards.

According to the invention the spectrophotometer as defined in the preamble is characterized in that the grating monochromator and the autocollimator form a grating lens which, as a single, physical structure, has on one side convex collimator lens structure and on the other side an externally mirrored grating structure, the plane of the grating structure being inclined at a relative small angle to the optical axis of the measuring system and/or to the optical axis of the collimator lens. The edges of the grating lens are blackened to extinguish undesired reflections.

From U.S. Pat. No. 4,838,645 a reflecting diffraction grating is known in which a grating monochromator and an autocollimator which form one whole optical system, but not a single physical structure.

In the simplest form the grating lens is made of an optically bright plastic, preferably acrylate glass (PMMA). By using inexpensive manufacturing methods such as injection molding or pressing, the cost price of such a lens can be low. It is also possible to co-form fastening edges which facilitate the mounting, Also, the mirroring of the grating lens with aluminum evaporated under vacuum can be realized in an inexpensive manner in a mass production.

The grating structure can be made in a mold for the lens in the form of a so-called ruled grating. The original master grating can be notched with a diamond chisel in an optically pure plane substrate by means of a so-called ruling engine. Ruled gratings have a higher efficiency than holographically made gratings. By making the proper selection of the blaze angle, the efficiency can be optimized for the desired measuring range, in this case the visible light spectrum. This is an advantage over concave gratings, with which it is difficult to obtain a comparable efficiency.

In a preferred embodiment the measuring system comprises a Littrow arrangement whereby light enters the housing in a first direction (Y-direction) and falls therein on the grating lens via an entrance slit and a reflecting element in a direction substantially perpendicular thereto, the negative Z-direction, while reflected light from the grating lens substantially falls on the detection means in the positive Z-direction. The measuring system thereby depicts the slit on the detection means.

To keep the rays falling on and reflected by the grating lens separated, the angle therebetween in the YZ-plane is in the order of 15 to 20°. It will be bright that this angle value is only motivated by practical considerations. The optical axis of the lens curvature in the X-direction, perpendicular to the YZ-plane, falls into the YZ-plane, namely in the Z-direction. The plane of the grating is inclined at an angle in the order of 6° to the XY-plane.

The detection means are formed by an array of photosensitive cells, the dimensions of which are in the order of 0.2×0.2 mm or less, while, furthermore, a cylindrical lens is present to converge the light from the grating lens on the photocells. The entrance slit extending in the Z-direction often has a size of about 2 mm, while the width thereof extending in the X-direction is about 0.2 mm, which corresponds with a band width of about 10 nm, so that, when the dimensions of the photocells is of the same order as the size of the projected entrance slit, an array length of 6 to 9 mm is necessary to enable depicting of the visible spectrum. Arrays of narrow long photocells in the size of the above slit are certainly manufactured, but they are considerably more expensive than the more conventional arrays, the cells of which have a smaller and substantially square cross-section, often in the order of 0.1×0.1 mm. For reasons of cost price, it is favorable to use these arrays, but the light-sensitivity of such small photocells is often lower. To compensate this drawback, the array in the device according to the invention is provided with a cylindrical lens which converges the about 2 mm high picture on the small photocells, which causes the local light intensity to be increased proportionally. Because of the small dimensions of the array the focal distance of the grating lens may also be small and thus the whole optical system. The whole housing of the measuring system can therefore be kept within the dimensions of 3×3×5 cm.

Scattered light and radiation of higher orders must be reduced or stopped in the conventional manner by providing stop filters in the optical path. The position of such stop filters, which have to act on a part of the useful spectrum, is just before at least part of the photocells. These filters can, for instance, be cemented to the cylindrical lens, thereby preventing additional surface reflections. An infrared stop filter may be arranged at the entrance of the system to prevent infrared scattered light to which silicon photodiodes are very sensitive. This filter is of such quality that the whole desired spectrum is sufficiently passed. Moreover, at a number of places in the housing of the measuring system plates are arranged which only leave an opening for the desired light bundle and thus form chambers in which scattered light extinguishes. This is in particular important to separate white light reflections.

In the simplest embodiment of the grating lens this lens is symmetrical with respect to rotation, the axis being directed between the virtual position of the slit and the middle of the array. A part of the light falling on the grating lens, at least 4%, will not pass through the lens part thereof to be mirrored back after diffraction, but already be mirrored back on the surface as white light; such reflections are called Fresnel reflections. Because a part of the white light is mirrored to the array, measuring errors arise. These are even intensified because the energy of the white light is much higher than that of the monochromatic light which is nominally measured by the photocells. In a preferred embodiment of the grating lens this is prevented by an "off-axis" design. The lens is, as it were, placed obliquely backwards, so that this scattered light reflects back at such an angle that it does not reach the array. This oblique placement causes considerable changes in the optical action of the lens. Because of the asymmetry, more image formation (coma) appears which adversely affects the optical band width of the measurement. Also, the angle of the grating with respect to the Y-axis in the XY-plane must be changed.

In a further improved embodiment the curvature of the lens in the Y-direction is made less strong than in the X-direction. The lens thus obtains a toric shape. It has been found that at a proper selection of the curvature in the Y-direction the optical deformation is strongly decreased, while the lens still sufficiently converges in the Y-direction. The cylindrical lens for the array needs to be only slightly magnified.

In yet another embodiment the lens is cylindrically shaped with only a curvature in the X-direction. In that case the image formation can become even smaller in the inclined position required to prevent Fresnel reflections. The picture of the entrance slit, however, thereby becomes even larger in the Y-direction, which may lead to an impractically large cylindrical lens or to a loss of sensitivity.

Furthermore, it proves to be also possible to inhibit Fresnel reflections when the collimator lens structure, that is to say the grating lens, is designed as one having a symmetric or slightly asymmetric toric shape, with a damping element being arranged in or near the middle.

The monochromator is often defined from the entrance slit. The admissible opening angle determines the light intensity of the system. Conventional is a numerical aperture of slightly larger than 0.1, which is half an opening angle of 6 to 8°. At a larger lens opening too much deformation occurs. In the grating lens according to the invention the optical deformation at a large aperture increases even more strongly than in the known multi-element systems. However, for use as a colorimeter this is no drawback or limitation because ISO standards for reflection measurement prescribe a small aperture. The half opening angle may be at most 5°.

In surface color measurement it is conventional to measure an approximately circular surface having a diameter of a few mm and not having a relatively long narrow slit. The testing targets are often small square color areas. In this optical system a good adaptation to an approximately round measuring opening can be obtained by making use of a lens which converges collimated light from the measuring opening in the X-direction on the entrance slit, while the lens contrarily diverges in the Y-direction through the longitudinal direction of the slit until at the total height of the grating lens. Therefore, in a concrete embodiment the measuring opening in the housing is substantially circular and between this measuring opening and the entrance slit a saddle-shaped lens is present which converges collimated light from the measuring opening in the X-direction, perpendicular to the YZ-plane, on the entrance slit, while this lens diverges the light reflected by the reflecting element in the Y-direction. Such a lens shape may also be inexpensively produced in plastic, for instance by an injection molding technique. Preferably, saddle-shaped lens is, in particular on the plane side, provided with an infrared stop filter, so that no infrared energy enters through the entrance slit into the housing of the measuring system.

Because the elements of the array of photosensitive elements are sensitive to various wavelength intervals in different ways, one or more blocking filters adjusted to different wavelength intervals may be arranged before the array of photosensitive elements. Very accurate filters are obtained in the form of an integrally formed blocking filter combination of filters secured against each other, the transition area extending obliquely in two directions X and Y or the transition areas extending obliquely parallel to each other in two directions X and Y. Here a transition area may be inclined in the X direction at an angle β of 10 to 70°, preferably of 10 to 40°, in particular approximately 20°, and in the Y direction at an angle α of 10 to 70°, preferably 30 to 60°, in particular 45°.

The spectrometer according to the invention is an inexpensive, handy and reliable instrument for measuring surface colors of printing matter, paint, plastics, textiles, foodstuffs, etc. In particular without illuminator the spectrophotometer may serve for measuring light sources, for instance for displays, for inspection of theater and studio lighting, office and street lighting. This spectrophotometer is in particular suitable for connection to a computer in which the information of the detection means can be processed.

The invention will now be explained in more detail with reference to the accompanying drawings, in which.

Figure 1:
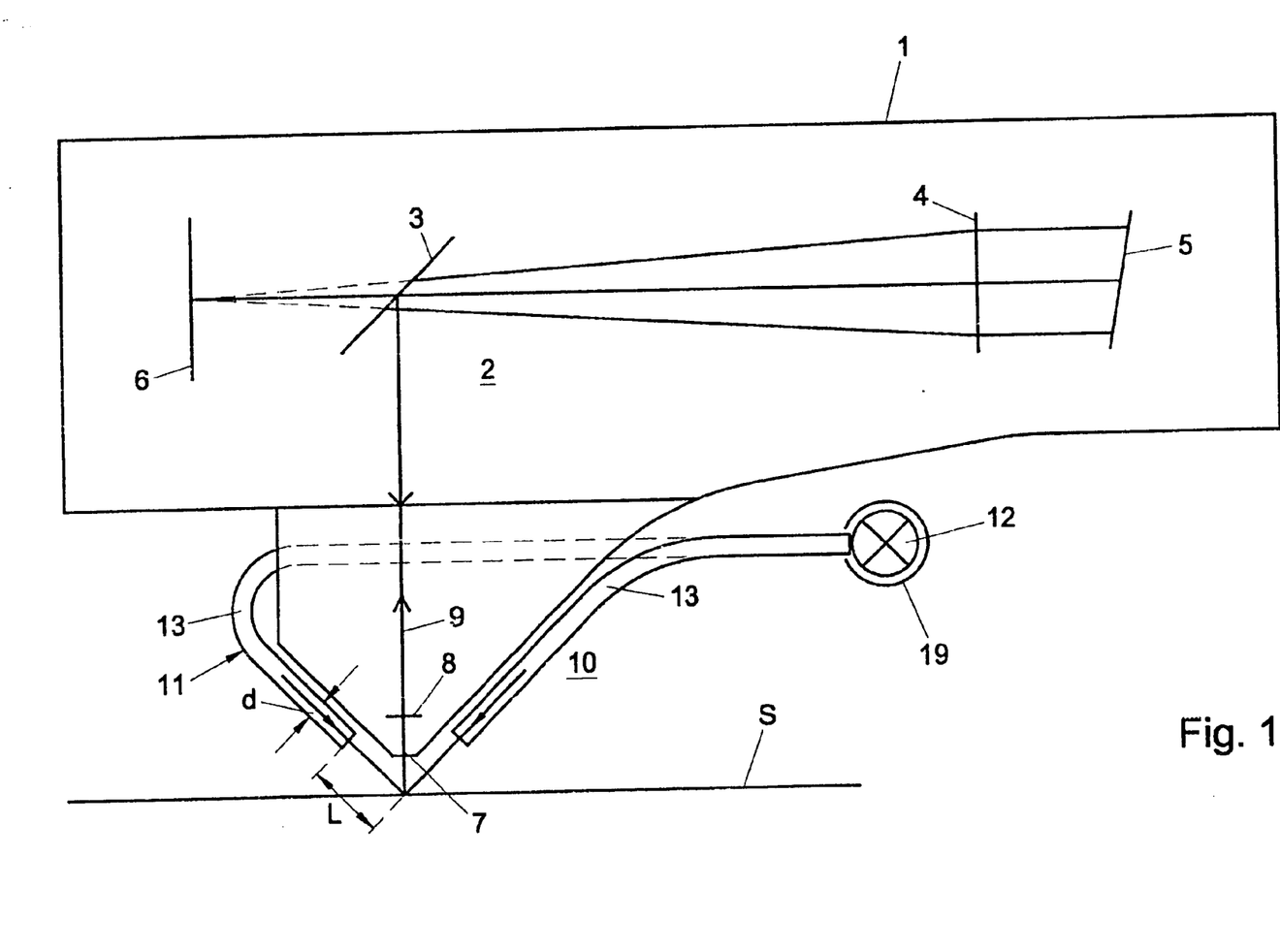
FIG. 1 shows a schematic structure of a spectrophotometer with a measuring system according to a Littrow arrangement.

The spectrophotometer shown in FIG. 1 comprises a housing 1, which encloses a measuring system 2 according to a Littrow arrangement with a reflecting element 3, a collimator lens 4, a grating monochromator 5, and a detector 6. As such a measuring system is known from E. G. Loewen, E. Popov; *Diffraction gratings and applications* (Marcel Dekker, Inc., New York, 1997), see in particular Section 12.5, the operation of this system needs no further discussion. The embodiment of the spectrophotometer described herein is intended to carry out reflection measurements. In this embodiment, a substantially parallel bundle 9, reflected by a specimen S, is supplied to the measuring system 2 via an entrance opening 7 and a lens 8.

The spectrophotometer comprises an illuminator 10 with an illuminator optic 11 and a lamp 12. The illuminator optic is formed by light conductors 13 which start at the lamp 12 and end in the form of a ring with a conoid-shaped radiating side. Such an illuminator optic is, for instance, known from U.S. Pat. No. 4,464,054. In this optic, the surface of the specimen 7 to be exposed is radiated at an angle of 45°, in accordance with the valid ISO standards, while a tolerance not exceeding ±5° appears. Of the light reflected and scattered by the specimen surface, a light bundle 9 is supplied via the opening with the lens 8 to the measuring system 2, perpendicularly to this surface. The lens 8 is of such design that the tolerance in the radiation direction of the bundle 9 also does not exceed ±5°. Since the invention relates to the measuring system and not to the illuminator, the operation thereof needs no further discussion. It will be clear that all kinds of possible known illuminators which comply with the valid ISO standards can be used here.

An exemplary embodiment of a measuring system for a spectrophotometer is shown in FIGS. 2–7. These figures also show an X,Y,Z-coordinate system, by means of which the measuring system will be described. The measuring system in these figures comprises a plane grating monochromator 14, an autocollimator 15 cooperating therewith, and detection means 16. The grating monochromator 14 and the autocollimator 15 form one whole, which will further be designated as grating lens 17. This grating lens has on one side a convex collimator lens structure and on the other side an externally mirrored grating structure. The convex collimator lens structure has an asymmetric toric shape. The grating lens is made of an optically bright plastic, in particular of acrylate glass, the edges being finished in black. The plane of the grating structure is inclined at an angle of approximately 6° to the XY-plane of the measuring system (see FIG. 3). The grating structure of the grating lens 17 is made in a mold in the form of a so-called ruled grating, the original master grating being notched with a chisel in an optically pure plane substrate by means of a so-called ruling engine.

The light bundle 9 passes through a round measuring opening 18 in the Y-direction (see FIG. 5), this is the entrance opening 7 in FIG. 1, into the housing 1. Via a saddle-shaped lens 19, an entrance slit 20 (see FIG. 5), and a reflecting element 21, the light rays move approximately in the negative Z-direction to the grating lens 17. The light decomposed by means of the grating lens 17 is then supplied, in the positive Z-direction and by means of a cylindrical lens 22, to an approximately 6 to 9 mm long array of photocells 23, the cell dimensions of which are smaller than 0.2×0.2 mm, in the present embodiment 0.1×0.1 mm. The cylindrical lens 22 and the array of photocells form the detection means 16.

Figure 2:
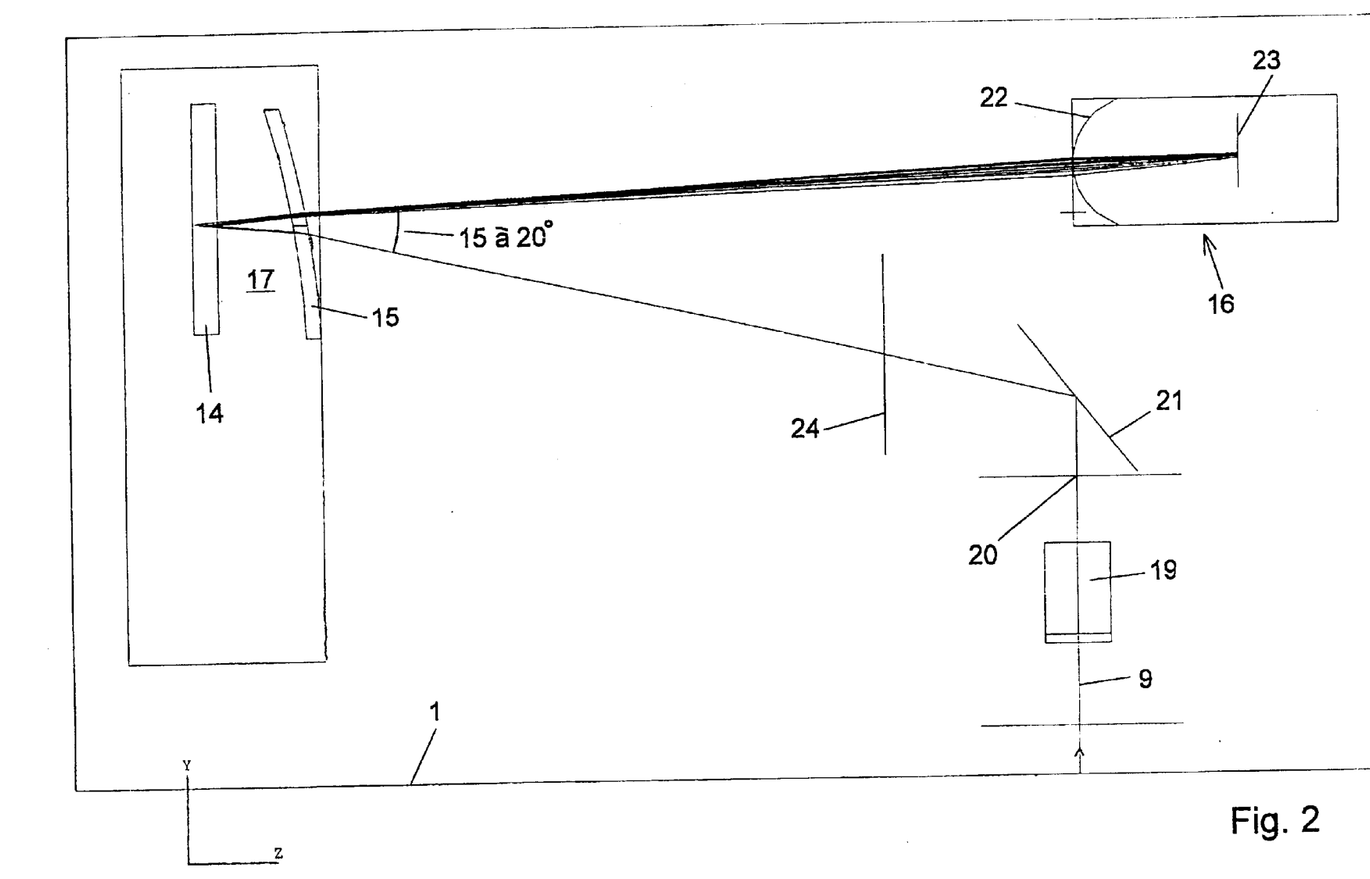
FIG. 2 shows a measuring system according to the invention, viewed in the YZ-plane.
Figure 7:
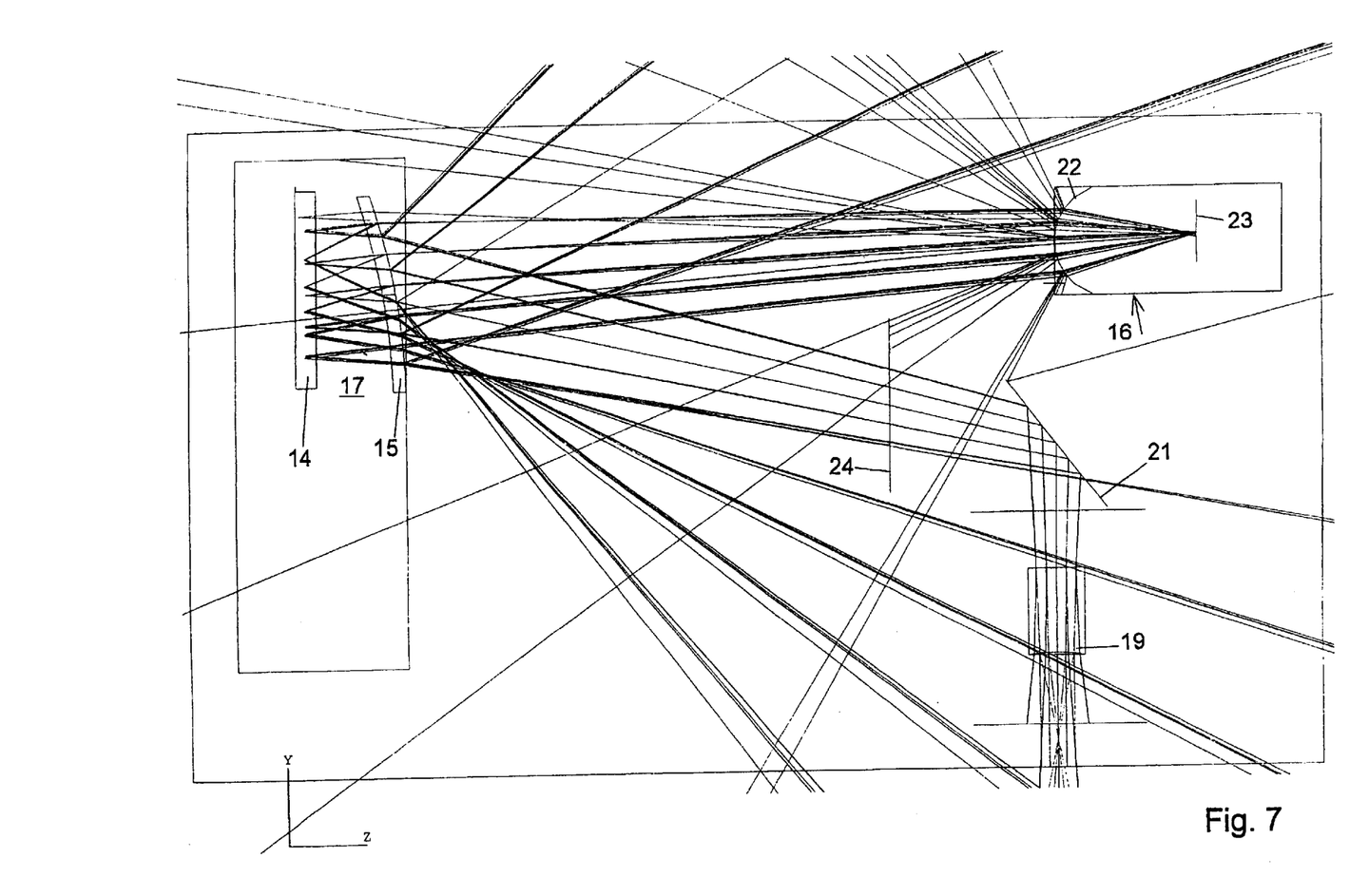
FIG. 7 is a similar front view of the measuring system as in FIG. 6, in which, however, Fresnel reflections are shown.

To keep the incoming and outgoing bundles separated from the grating lens, the mirroring element 21 is placed at an angle to the XZ-plane slightly exceeding 45°, which results in an angle between the incoming and outgoing bundles from the grating lens of approximately 15 to 20° (see FIG. 2). By tilting the grating lens 17 in the YZ-plane slightly backwards, as can be seen in FIG. 2, Fresnel reflections, as shown in FIG. 7, remain out of range of the detection means, while, furthermore, Fresnel reflections appearing at the cylindrical lens 22 owing to the strong curvature also exert substantially no disturbing effect.

By means of the saddle-shaped lens 19, the light entering the housing 1 through the round opening 18 is focused in the XY-plane on the entrance slit 20. The converging properties of the lens 19 in the XY-plane are then such that substantially only the (collimated) light entering at 0° falls on the grating lens. The saddle-shaped lens 19 further has diverging properties in the YZ-plane (see FIG. 6), which are such that the (collimated) light entering substantially at 0° mainly covers the entire height of the grating lens. The light bundle leaving the grating is then focused by the cylindrical lens 22 on the array of photocells 23.

Figure 3:
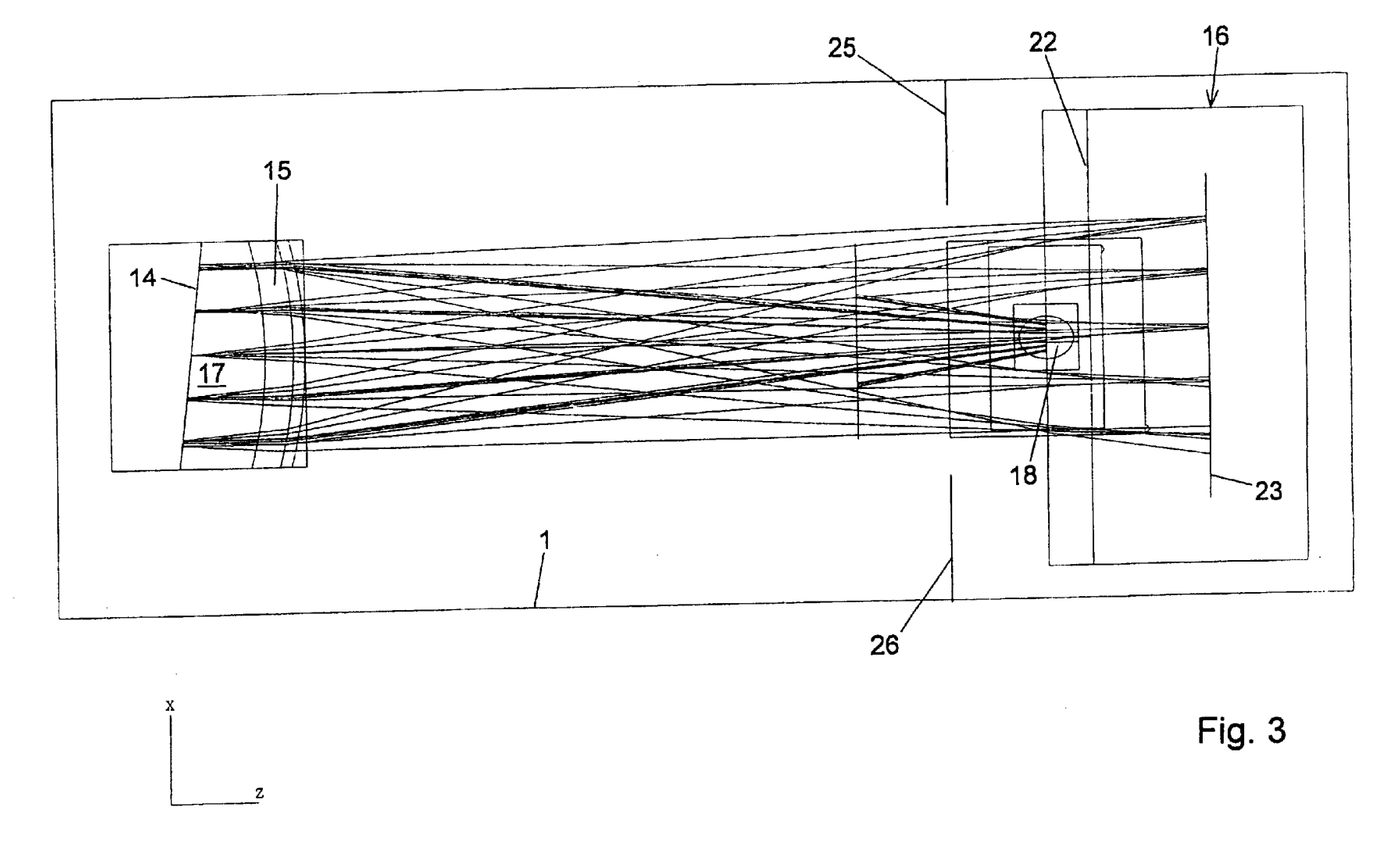
FIG. 3 shows the measuring system of FIG. 2, viewed in the XZ-plane.
Figure 4:
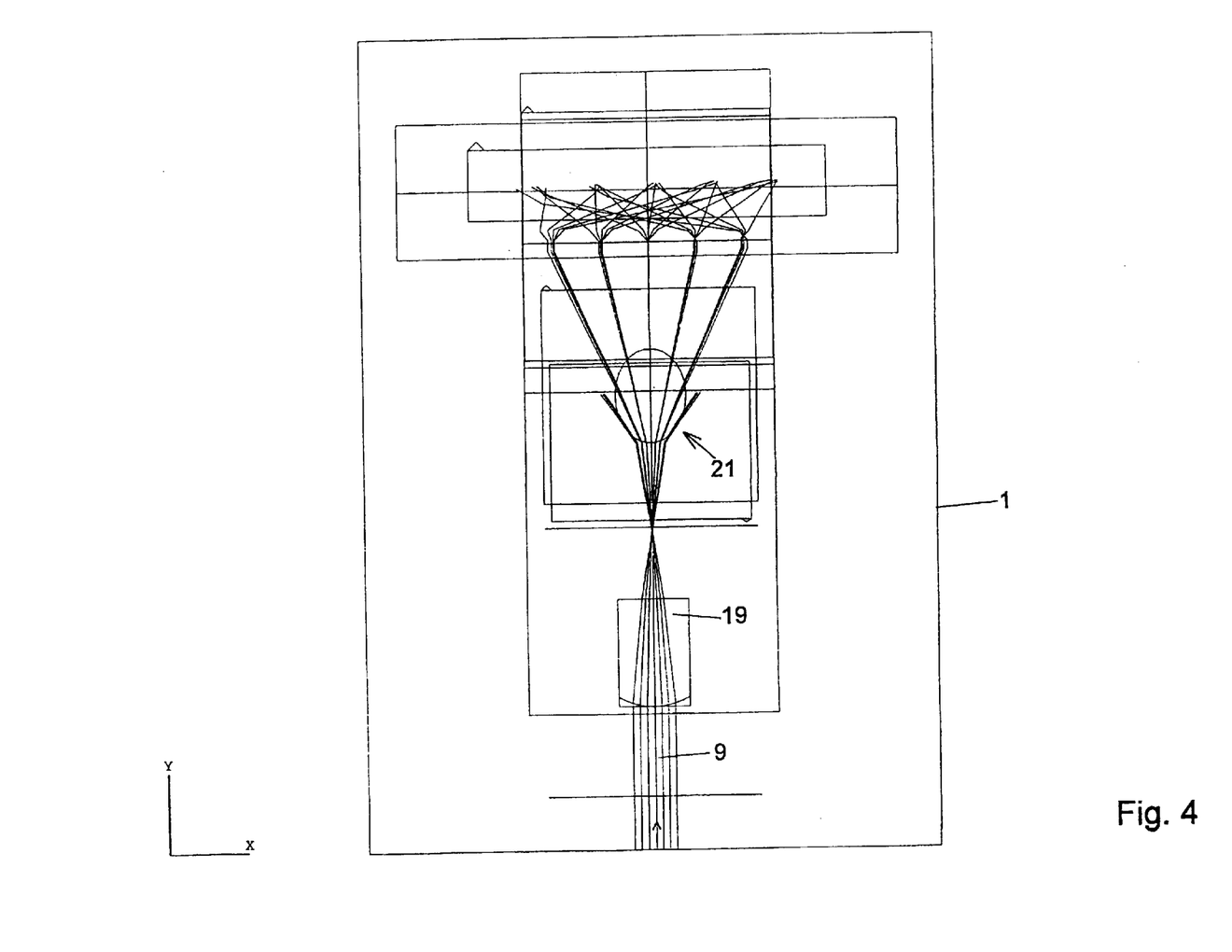
FIG. 4 shows the measuring system of FIGS. 2 and 3, viewed in the XY-plane.
Figure 5:
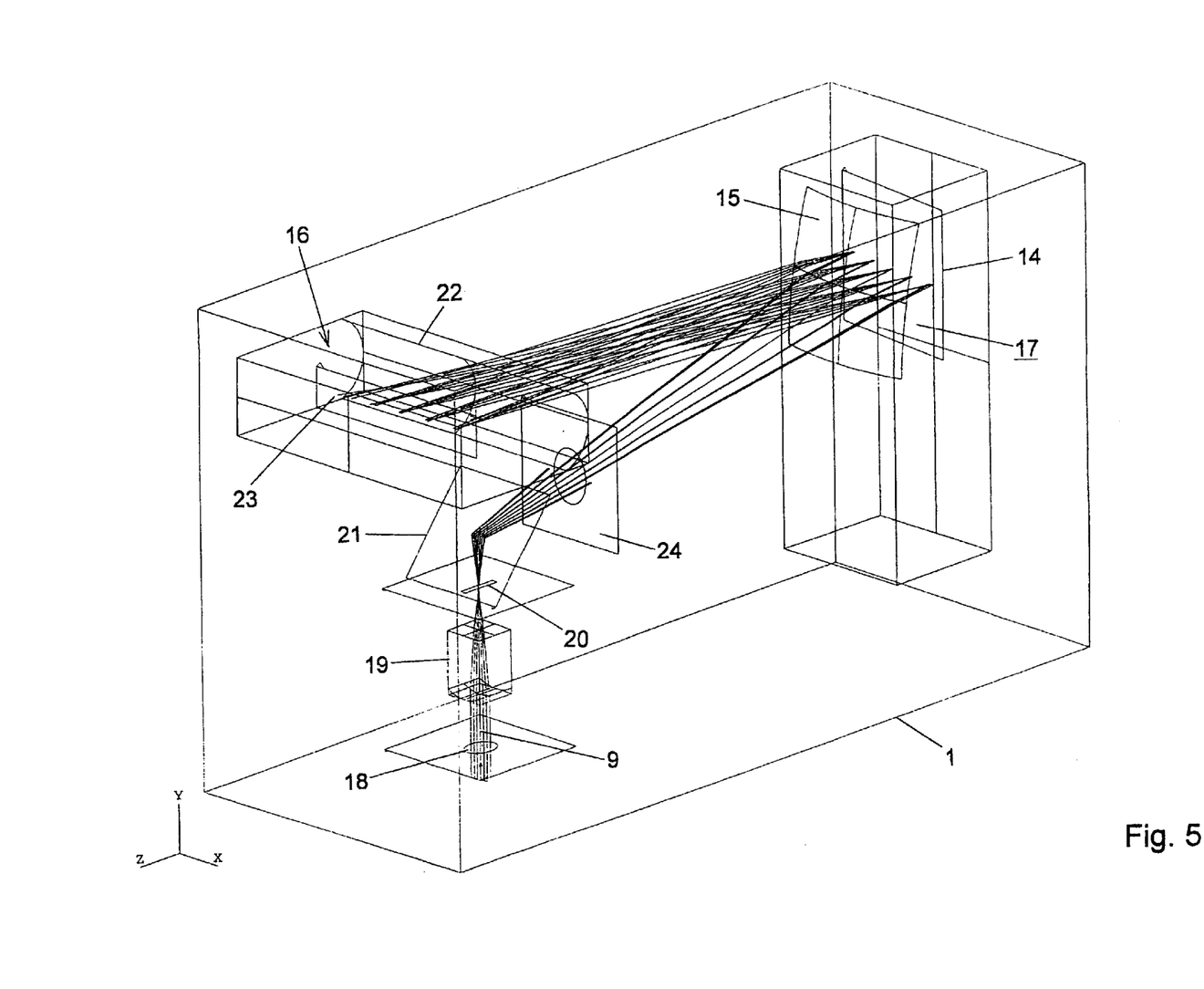
FIG. 5 is a perspective view of the measuring system of FIGS. 2 and 3, which the operation of the saddle-shaped lens in the XY-plane is also shown.
Figure 6:
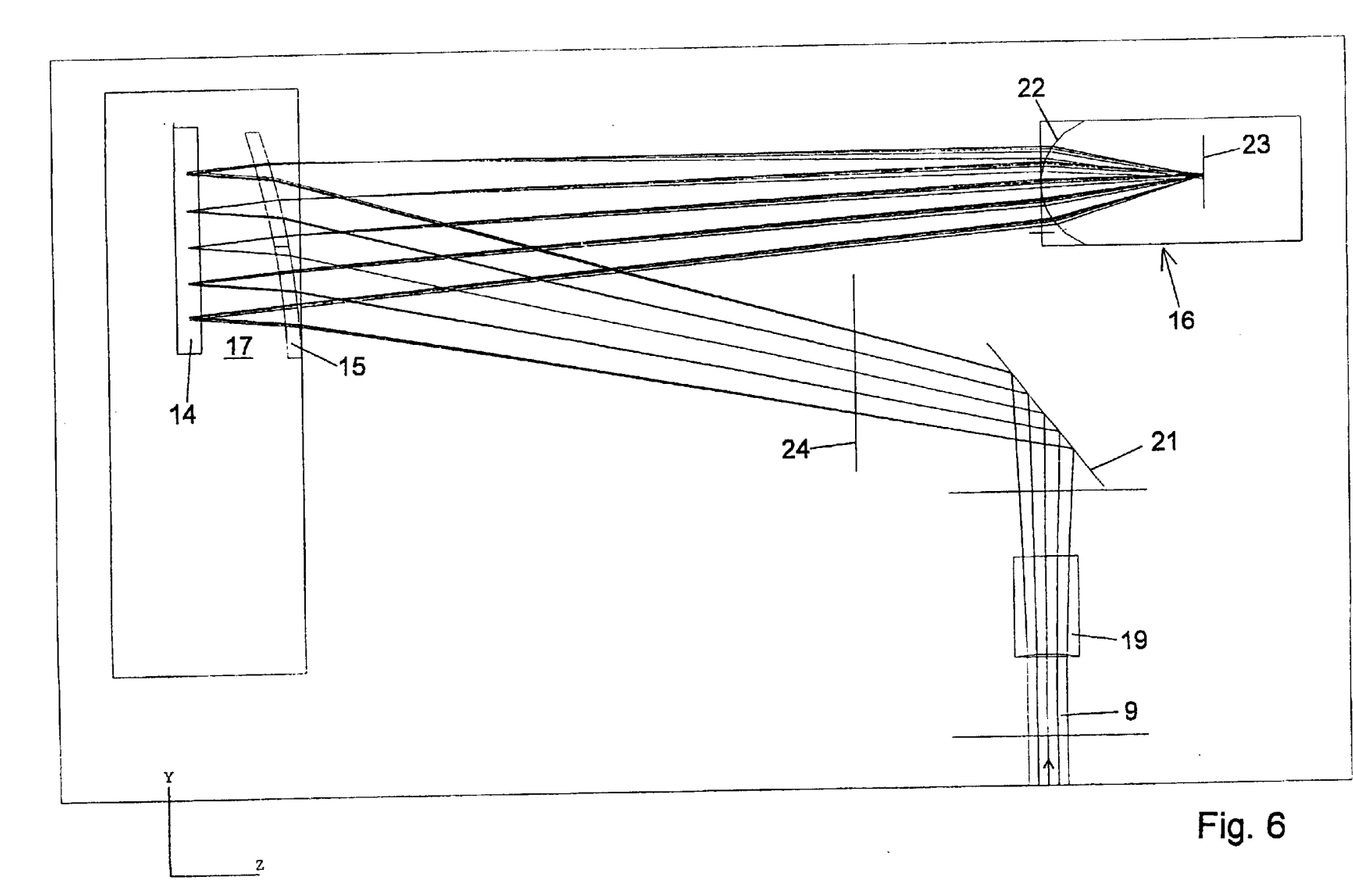
FIG. 6 is a more enlarged view of the measuring system, viewed in the YZ-plane, in which the operation of the saddle-shaped lens in the YZ-plane is also shown.

The saddle-shaped lens 19 is provided on the plane side with an infrared filter. Furthermore, plates, light-absorbing elements, stop filters, and the like, may be arranged in the housing 1 to eliminate the effects of undesired light diffusion as much as possible. Thus, the figures schematically show a plate 24 with a passage opening for the bundle reflected by the mirroring element (see FIG. 5). Furthermore, as shown in FIG. 3, plates 25 and 26 may be present to enable suppression and absorption of the effects of Fresnel reflections and other appearing scattered light. Of these plates, the position in the Z-direction is preferably equal to that of the plate 24 in FIG. 2.

Figure 8:
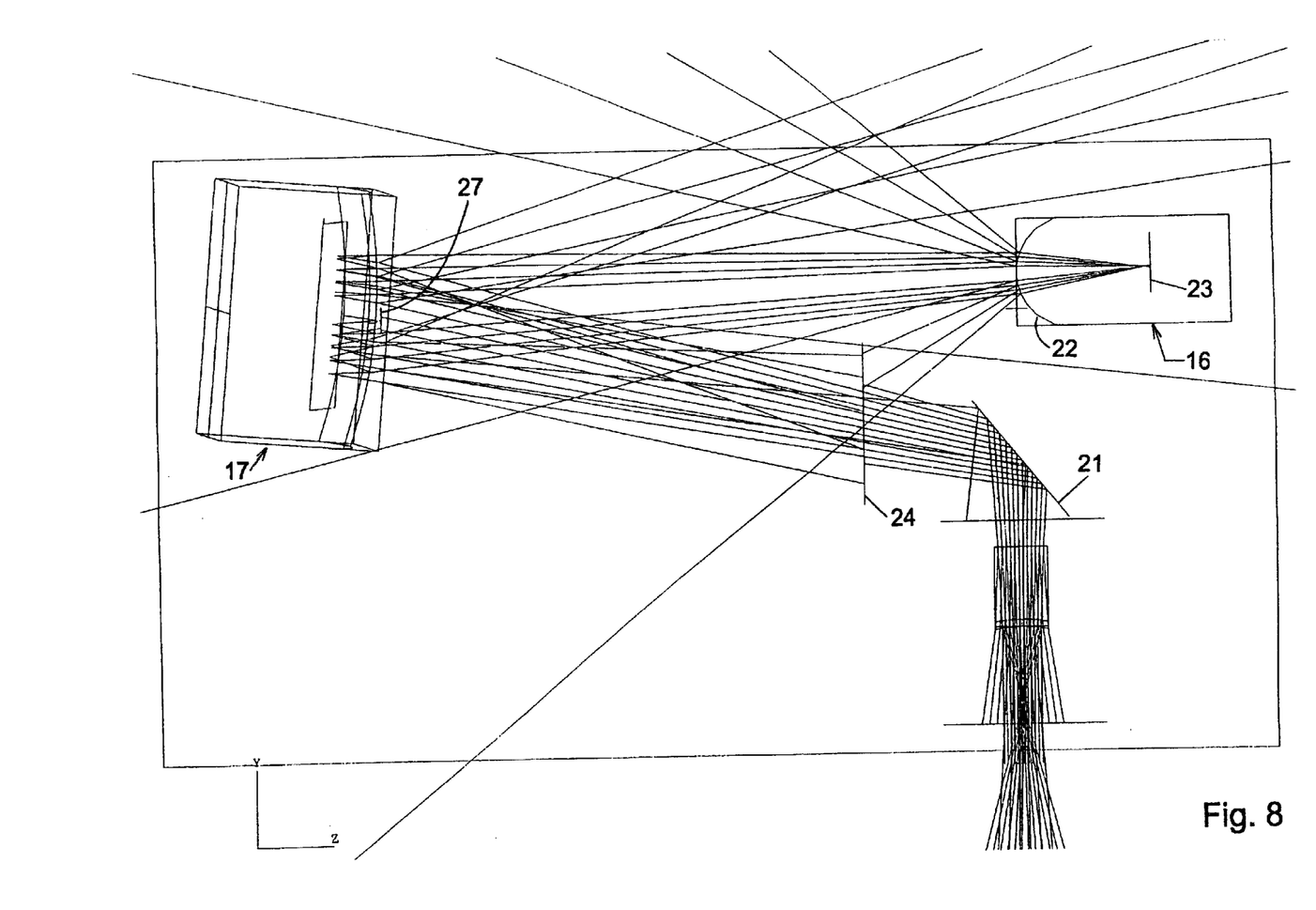
FIG. 8 shows an alternative way of minimizing the effects of Fresnel reflections on the detection.

FIG. 8 shows an alternative arrangement for preventing Fresnel reflections on the lens surface of the grating lens 17.

To this end, a small damping element 27 is arranged in the middle of the lens, in the form of a black small plane or a small pyramid of black plastic. Through the spherical shape of the lens surface, which diverges reflections but converges transmissions, only a relatively small element is required to prevent reflections from finding their way to the array of photocells 23. As appears from FIG. 8, a part of the desired light is stopped as well. It turns out, however, that this is less than 15% of the total light amount. The advantages of this construction are that it is not necessary for the grating lens 17 to be asymmetric, so that the image formation through coma is smaller, and that a symmetric lens can be manufactured in a less expensive way with the required accuracy. In an injection molded product, the asymmetry leads to more deformation through material shrinkage during the solidification phase. It is noted that the grating lens does retain its toric character.

It is possible, however, to design the grating lens 17 to be slightly asymmetric in the Y-direction, while placing the damping element a little outside the middle, in particular in a slightly lower position.

Figure 9:
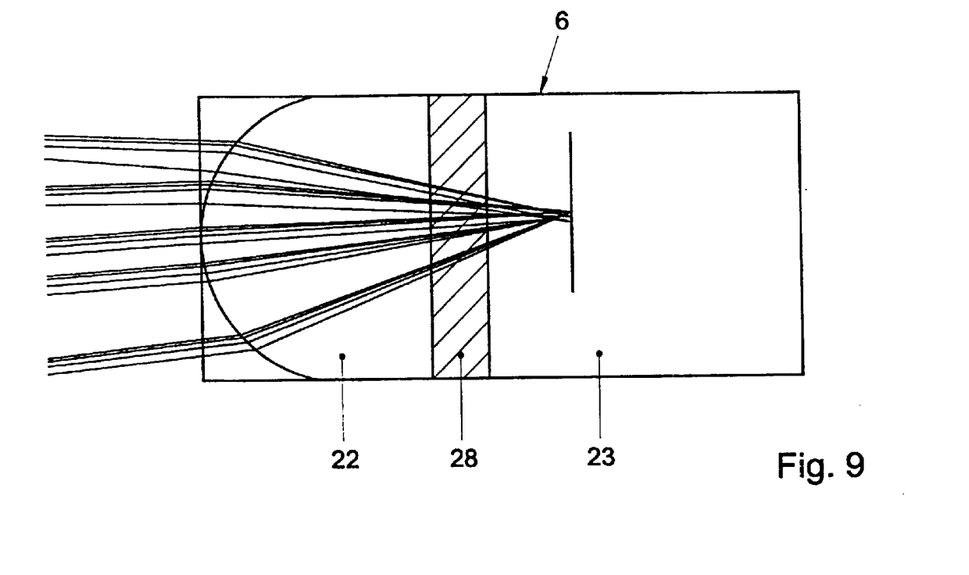
FIG. 9 shows a detector arranged in the measuring system, provided with blocking filters.

As shown in FIG. 9, blocking filters 28 can be placed before the array of photocells 23. These filters are used to block higher order reflections, in particular second order reflections of the grating lens 17. By placing filters (long pass filters) before the array cells for the range of 6,000 to 8,000 nm, the coincident second order radiation in the range of 300 to 400 nm is prevented from reaching these cells. Also, filters (short pass filters and/or band pass filters) can be used in the range of 300 to 5,000 nm to ensure that red scattered light is retained. Since the employed photodiodes are more sensitive to red light than to blue light, it is conducive to the measuring accuracy in the blue part of the spectrum to retain even the least red scattered light with a blocking filter.

The blocking filters 28 are preferably placed just before the photocell array 23. In particular, they are cemented to the cylindrical lens 22 and the array 23 with an optical resin. The filters have a physical thickness in the Z-direction in the order of 1 mm.

Figure 10:
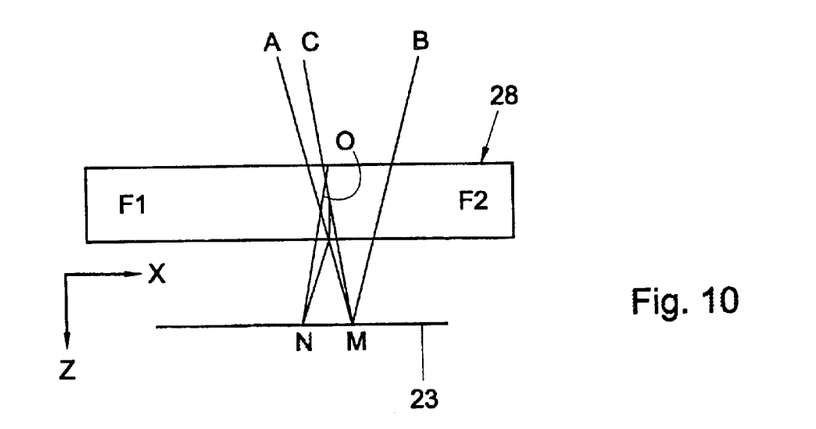
FIG. 10 shows a blocking filter combination, the two filters of which are secured straight against each other.
Figure 11:
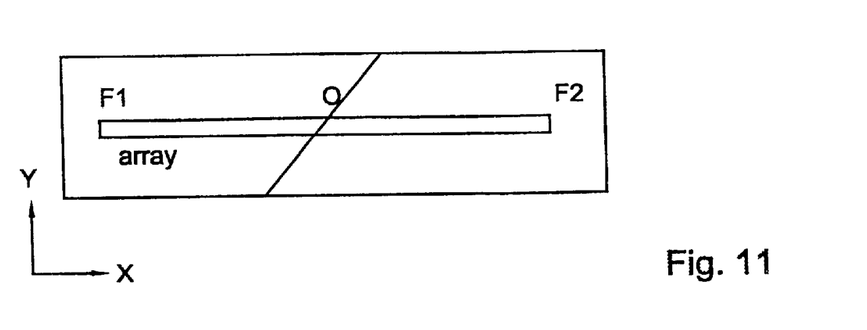
FIG. 11 shows a blocking filter combination, the two filters of which are arranged obliquely against each other.

In the simplest form, two filters, a blue-green filter F1, mostly of glass, and a yellow, orange or red filter F2, of glass or plastic, are placed straight against each other, as shown in FIG. 10. Small differences in the refractive index between the filter and the optically bright resin with which they have been cemented, will cause reflections to appear on the side of the filters at the transition O of the two filters for light rays passing through the glass surface at a small angle with respect to the normal. Often, the refractive index, both of the filter and of the cement, is in the order of approximately 1.54 to 1.57, but never exactly equal. A difference in the refractive index in the order of approximately 1% is often unavoidable. By means of Snellius' refraction law, it can be determined that, when the angle of incidence comes to exceed approximately 82° to the normal, total reflection appears. This means that light entering at an angle less than 8° with respect to the z-axis cannot pass through the boundary face O, but is reflected thereon. Since the light from the grating lens 17 passes through the filters exactly at such small angles with respect to the z-axis, optical errors reducing the measuring accuracy will develop in the surroundings of the transition O. As appears from FIG. 10, a part of the light rays from directions between AM and BM, which are directed to the photocell M of the array 23, will find its way to the photocell N through reflection on the boundary face O. This causes light of a wavelength pertaining to the cell M to be measured as if it had the wavelength pertaining to cell N, which results in an enlargement and deformation of the band width of the spectrometer in the surroundings of the boundary face O of the filters F1 and F2. Another drawback of the construction shown in FIG. 10 is that the blocking properties directly to the left and right of the boundary face O are so much different that in many cases a small, but disturbing leap in the spectrophotometer response will occur at the location of the transition as a result of a difference in scattered light contribution. To reduce these errors, it is known to make use of merging filters, as shown in FIG. 11. This causes the effect of the transition O to be spread over a longer range, so that the errors are spread as well and thereby masked. The reflection errors, however, are not removed therewith, and especially in a spectrophotometer of the type in which the thickness of the filter glass (about 1 mm) is large with respect to the linear dispersion which is in the order of 0.02 mm per nm, such a transition causes a significant loss of quality.

Figure 12:
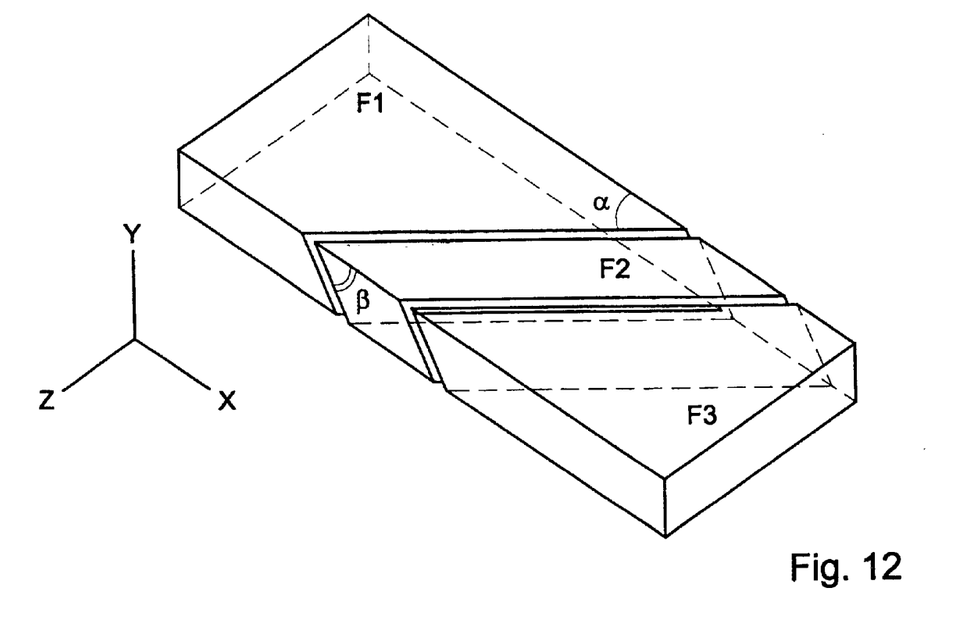
FIG. 12 shows a three-fold blocking filter combination, the middle filter of which has the shape of a parallelepiped.
Figure 13:
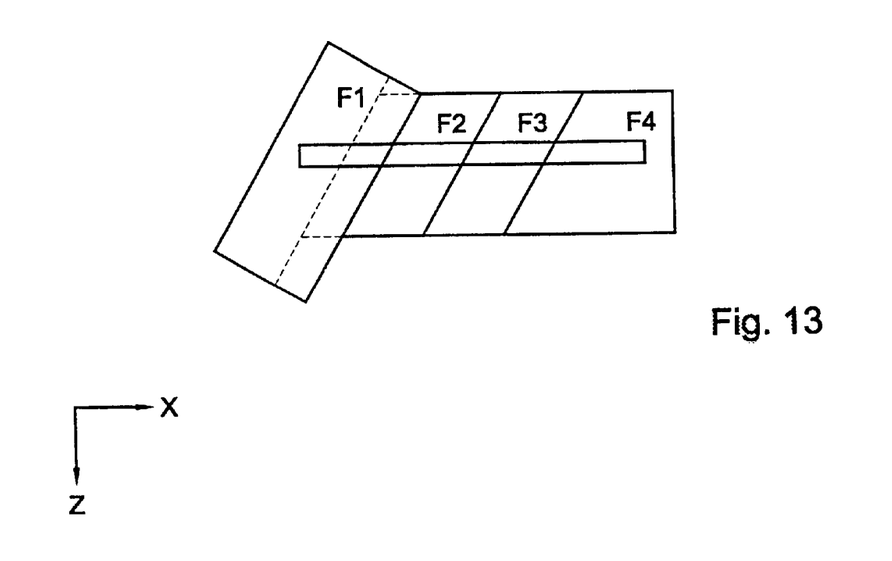
FIG. 13 shows a four-fold blocking filter combination.

FIG. 12 shows an assembly of blocking filters F1, F2, and F3 according to the invention, adjusted to different wavelength intervals, with which the above errors can be considerably limited. The middle filter F2 has the shape of a parallelepiped with inclined angles α and β. The two transition faces are mutually parallel, α being the angle at which the transition faces extend in the Z-direction and β being the angle at which the transition faces extend in the X-direction. The outer filters F1 and F3 are rectangular on the outer end, while they connect to the slanting sides of the filter F2 on the inner side. Although three filters are used here, it is also possible to use two filters, for instance by omitting the filter F2 in FIG. 12. Also, the number of filters can be increased by inserting several parallelepiped-shaped filters. In a preferred embodiment, the angle α is approximately 45° and the angle β about 20°. Of course, other angles can be chosen as well, which angles will particularly range between 10 and 70°, α ranging preferably between 30 and 60° and β preferably between 10 and 40°. The complicated filter shapes can be made of plastic by means of, for instance, injection molds. Where glass filters are used, the shape may optionally be simplified to reduce the cost of processing by selecting a shape rectangular in one direction and causing the ends to protrude, as shown in FIG. 11. In this figure, F1 is a glass filter, and F2, F3 and F4 are plastic filters. Of course, even more glass filters can thus be arranged in combination. It is also possible to completely or partly superpose two or more layers of such filters. Combinations of blocking filters can be formed therewith in the light path, so that the scattered light suppression can be improved even further. The blocking filter according to the invention, as described herein, can be used not only in the spectrophotometer described herein, but in all possible types of spectrophotometers.

The invention is not limited to the exemplary embodiment described with reference to the drawings, but comprises all kinds of modifications thereof, of course as far as falling within the scope of protection of the appended claims. In particular, it is pointed out that the illuminator is quite optional and is only present for reflection measurements. Without an illuminator, the spectrophotometer can also be used for, for instance, emission and transmission measurements.

What is claimed is:

1. A spectrophotometer, comprising a housing in which a measuring system is arranged, which housing has a measuring opening, via which light is passed to the measuring system, and whereby the measuring system comprises a grating monochromator, an autocollimator cooperating therewith, and detection means for the light originating from the grating monochromator, characterized in that the grating monochromator and the autocollimator form a grating lens which, as a single, physical structure, has on one side convex collimator lens structure and on the other side an externally mirrored grating structure, the plane of the grating structure being inclined at a relative small angle to the optical axis of the measuring system and/or to the optical axis of the collimator lens.

2. The spectrophotometer according to claim 1, characterized in that the edges of the grating lens are black.

3. The spectrophotometer according to claim 1, characterized in that the grating lens is made of an optically bright plastic.

4. The spectrophotometer of claim 1, characterized in that grating structure of the grating lens is made in a mold for the lens in the form of a ruled grating, whereby the original master grating is notched with a diamond chisel in an optically pure plane substrate by means of a ruling engine.

5. The spectrophotometer of claim 1, characterized in that the measuring system comprises an arrangement whereby light enters the housing in a first direction (Y-direction) and falls therein on the grating lens via an entrance slit and a reflecting element in a direction substantially perpendicular thereto, the negative Z-direction, while reflected light from the grating lens substantially falls on the detection means in the positive Z-direction.

6. The spectrophotometer according to claim 5, characterized in that the angle between the incoming and outgoing light from the grating lens is located in the YZ-plane in the order of 15 to 20°.

7. The spectrophotometer according to claim 5, characterized in that the optical axis of the grating lens is inclined in the YZ-plane at a relatively small angle to the optical axis between the grating lens and the detection means.

8. The spectrophotometer according to claim 1, characterized in that the detection means are formed by an array of photosensitive elements, the dimensions of which are in the order of 0.2×0.2 mm or less, while, furthermore, a cylindrical lens is present to converge the light from the grating lens on the photosensitive elements.

9. The spectrophotometer according to claim 1, characterized in that the dimensions of the housing of the measuring system are less than 3×3×5 cm.

10. The spectrophotometer according to claim 1, characterized in that the collimator lens structure is one having an asymmetric shape.

11. The spectrophotometer according to claim 1, characterized in that the collimator lens structure is one having an asymmetric toric shape.

12. The spectrophotometer according to claim 1, characterized in that the collimator lens structure is one having a symmetric or slightly asymmetric toric shape, with a damping element being arranged in or near the middle.

13. The spectrophotometer according to claim 5, characterized in that the measuring opening in the housing is substantially circular, between which measuring opening and the entrance slit a saddle-shaped lens is present which converges collimated light from the measuring opening in the X-direction, perpendicular to the YZ-plane, on the entrance slit, while this lens diverges the light reflected by the reflecting element in the Y-direction.

14. The spectrophotometer according to claim 13, characterized in that the saddle-shaped lens is provided with an infrared stop filter.

15. The spectrophotometer according to claim 8, characterized in that before the array of photosensitive elements one or more blocking filters adjusted to different wavelength intervals are arranged.

16. The spectrophotometer according to claim 15, characterized in that the blocking filters are formed by filters secured against each other, the transition area extending obliquely in two directions X and Y or the transition areas extending obliquely parallel to each other in two directions X and Y.

17. The spectrophotometer according to claim 16, characterized in that a transition area is inclined in the X direction at an angle $\alpha$ of 10 to 70°, and in the Y direction at an angle $\alpha$ of 10 to 70.

18. The spectrophotometer according to claim 3, wherein the optically bright plastic is acrylate.

19. The spectrophotometer according to claim 16, characterized in that a transition area is inclined in the X direction at an angle $\alpha$ of 10 to 40° and in the Y direction at an angle $\alpha$ of 30 to 60°.

20. The spectrophotometer according to claim 16, characterized in that a transition area is inclined in the X direction at an angle $\alpha$ of 20° and in the Y direction at an angle $\alpha$ of 45°.

* * * * *